United States Patent
Ogata

(10) Patent No.: US 8,120,496 B2
(45) Date of Patent: Feb. 21, 2012

(54) IC TAG LABEL

(75) Inventor: Tetsuji Ogata, Tokyo-To (JP)

(73) Assignee: Dai Nippon Printing Co., Ltd., Shinjuku-ku (JP)

( * ) Notice: Subject to any disclaimer, the term of this patent is extended or adjusted under 35 U.S.C. 154(b) by 338 days.

(21) Appl. No.: 12/444,179

(22) PCT Filed: Oct. 9, 2007

(86) PCT No.: PCT/JP2007/069676
§ 371 (c)(1),
(2), (4) Date: Apr. 29, 2009

(87) PCT Pub. No.: WO2008/047630
PCT Pub. Date: Apr. 24, 2008

(65) Prior Publication Data
US 2009/0303011 A1    Dec. 10, 2009

(30) Foreign Application Priority Data

Oct. 12, 2006  (JP) ................. 2006-278534

(51) Int. Cl.
*G08B 13/14*    (2006.01)
(52) U.S. Cl. .................... 340/572.7; 156/265

(58) Field of Classification Search ............... 340/572.7, 340/572.8; 29/592.1, DIG. 1; 156/265
See application file for complete search history.

(56) References Cited

U.S. PATENT DOCUMENTS 6,019,865 A * 2/2000 Palmer et al. ................. 156/265
6,265,977 B1 * 7/2001 Vega et al. ................. 340/572.7

FOREIGN PATENT DOCUMENTS

| JP | 09-135189 A1 | 5/1997 |
| JP | 2004-318605 A1 | 11/2004 |
| JP | 2005-071063 A1 | 3/2005 |
| JP | 2006-010731 A1 | 1/2006 |
| JP | 2006-236081 A1 | 9/2006 |

* cited by examiner

*Primary Examiner* — John A Tweel, Jr.
(74) *Attorney, Agent, or Firm* — Burr & Brown

(57) ABSTRACT

An IC tag label includes an inlet substrate, an IC chip protection sheet, 4 which is mounted on one surface of the inlet substrate 11 and an antenna pattern and an IC chip which are mounted on the other surface of the inlet substrate. An adhesive layer is mounted on the other surface of the inlet substrate to cover the antenna pattern and IC chip. An opening, which serves as a clearance for the IC chip, is formed in a portion of the IC chip protection sheet-4, the portion corresponding to the IC chip.

14 Claims, 6 Drawing Sheets

IC TAG LABEL

FIELD OF THE INVENTION

The present invention relates to an IC tag label that is structured to avoid damage to an IC chip. More specifically, the present invention relates to an IC tag label that is used, for instance, as a shipping tag attached to a baggage, packing case, or the like, a merchandise label, a product management tag, a voucher, or the like, and structured to reduce the protrusion height of an IC chip section.

The present invention is mainly applicable to the manufacture or use of IC tag labels and, more specifically, to such categories as transportation, distribution, inventory control, and plant process control of IC tag labels.

BACKGROUND OF THE INVENTION

Noncontact IC tag labels are now frequently used as recognition media in the fields, for instance, of transportation and distribution, or used for product quality control, inventory control, and various other purposes because they can record and retain information and establish noncontact communication to exchange the information with an external device.

However, when a noncontact IC tag label is used as a distribution label, it is frequently exposed to unavoidable external stress. It is fatally damaged particularly if its IC chip section receives an impact. Therefore, a structure for protecting the IC chip section was conceived in the past to avoid such a problem. However, such a structure was complicated so that noncontact IC tags could not be manufactured at a low cost.

An unavoidable structural problem of noncontact IC tag labels is that IC chips are much greater in thickness than an employed substrate and other parts. The IC chips for IC tags have been reduced in size and thickness. However, recently manufactured IC chips have a size between 0.2 mm square and 2 mm square and a thickness between approximately 100 µm and 400 µm. Therefore, when an IC chip is mounted on a substrate with an antenna pattern, even if the IC chip is covered with a surface protection member and flattened, the height of the IC chip section is remarkable when the IC tag labels are stacked.

It is conceivable that IC chips may become damaged when they are stacked. When noncontact IC tag labels are to be used, several or more than a dozen of them are often stacked. For increased ease of use, labels are usually disposed so that they are oriented in the same direction. When the labels are oriented in the same direction, the IC chip sections are necessarily stacked vertically aligned. If, in such an instance, a heavy object is placed on top of the labels, any one of the vertically-aligned adjacent IC chips are impacted so that the IC chips containing a silicon crystal are damaged. In this case, the labels, although they are unused, are suspected of being defective.

In a different situation where an IC tag attached to a hard article collides with a hard object, a protruding IC chip section receives an impact.

Patent Document 1 describes a prior application filed by the applicant of the present invention and relates to a noncontact IC tag label that is formed by inserting a thin-layer structure into the area around an IC chip for IC chip protection purposes. The IC tag label disclosed in Patent Document 1 entails an increased production cost because of the material cost of the structure and the difficulty in inserting the structure into its position.

Patent Document 1: JP-A-2006-236081

SUMMARY of THE INVENTION

Problem to be Solved by the Invention

When a structure is inserted into the area around an IC chip as described in Patent Document 1, the material cost and production cost are higher than those for a normal IC tag label due to a cost increase by the insertion of the structure. In addition, the insertion of the structure increases the thickness of an IC tag label. Therefore, when such an IC tag label is attached to a commodity, surface irregularities arise due to the level difference between the IC tag label and the commodity surface. Under such circumstances, the present invention is implemented by studying the structure of an IC tag label, the structure providing IC chip protection without affecting the material cost and production cost and without increasing the thickness of the IC tag label.

Means for Solving the Problem

According to a first aspect of the present invention, there is provided an IC tag label including: an inlet substrate; an antenna pattern and an IC chip, which are mounted on either one surface or the other surface of the inlet substrate; an IC chip protection sheet, which is mounted on one surface of the inlet substrate; and an adhesive layer, which is mounted on the other surface of the inlet substrate, wherein a clearance for the IC chip is provided in a portion of the IC chip protection sheet, the portion corresponding to the IC chip.

According to a second aspect of the present invention, there is provided the IC tag label as described in the first aspect, wherein the antenna pattern and the IC chip are mounted on the other surface of the inlet substrate.

According to a third aspect of the present invention, there is provided the IC tag label as described in the first aspect, wherein the antenna pattern and the IC chip are mounted on one surface of the inlet substrate, and an additional film for covering the antenna pattern and the IC chip is disposed between the inlet substrate and the IC chip protection sheet.

According to a fourth aspect of the present invention, there is provided the IC tag label as described in the first aspect, wherein an opening that serves as the clearance for the IC chip is provided in a portion of the IC chip protection sheet, the portion corresponding to the IC chip.

According to a fifth aspect of the present invention, there is provided the IC tag label as described in the first aspect, wherein a cut-out that is extended to one end edge of the IC chip protection sheet to provide the clearance for the IC chip is made in a portion of the IC chip protection sheet, the portion corresponding to the IC chip.

According to a sixth aspect of the present invention, there is provided the IC tag label as described in the first aspect, wherein a belt-like groove that is extended from one end edge of the IC chip protection sheet to the other end edge thereof to provide the clearance for the IC chip is made in a portion of the IC chip protection sheet, the portion corresponding to the IC chip, and a pair of strip-shaped structures, which constitute the IC chip protection sheet, are formed on either side of the belt-like groove.

According to a seventh aspect of the present invention, there is provided the IC tag label as described in the first aspect, wherein the IC chip protection sheet includes a plastic sheet and a protection sheet bond layer or adhesive layer, and has a thickness between 40 nm and 200 nm.

According to an eighth aspect of the present invention, there is provided the IC tag label as described in the first aspect, wherein the IC chip protection sheet includes a paper substrate and a protection sheet bond layer or adhesive layer, and has a thickness between 40 nm and 200 nm.

ADVANTAGES OF THE INVENTION

The IC tag label according to the present invention is such that the clearance for the IC chip is provided in the IC chip protection sheet to avoid an increase in the thickness of the IC chip section. Therefore, the IC chip is not likely to become damaged when it receives an external impact. Further, the IC tag label according to the present invention does not increase the material cost and production cost because it can be manufactured without any additional particular material unlike an IC tag label having a conventional configuration.

Furthermore, even when the IC tag label according to the present invention is in the form of a continuously wound product, the IC chip does not become damaged due to strong pressure that is exerted by winding during manufacture or after completion of production.

DETAILED DESCRIPTION OF THE INVENTION

First Embodiment

Figure 1:
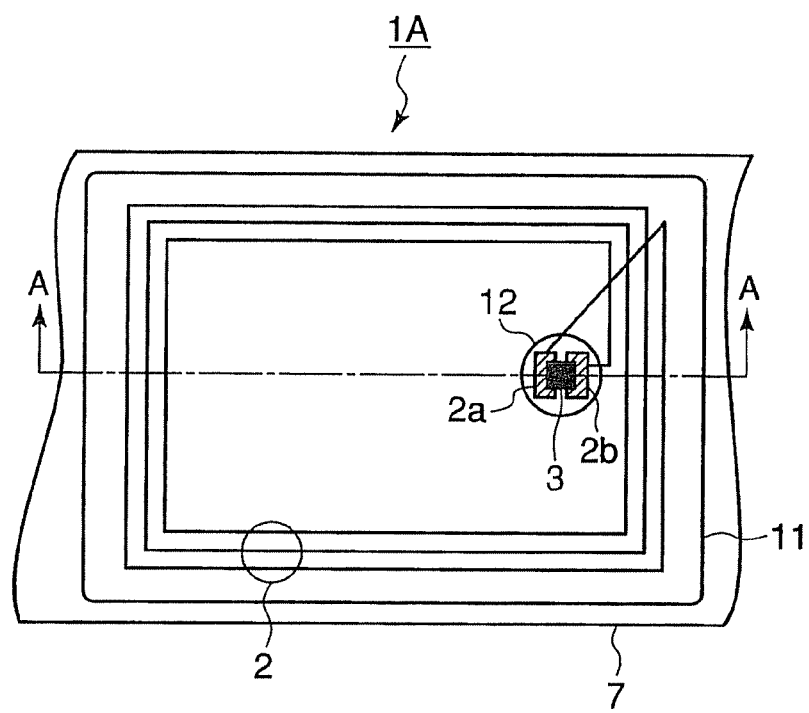
FIG. 1 is a plan view illustrating an IC tag label according to mode 1-1 of a first embodiment of the present invention.
Figure 2:
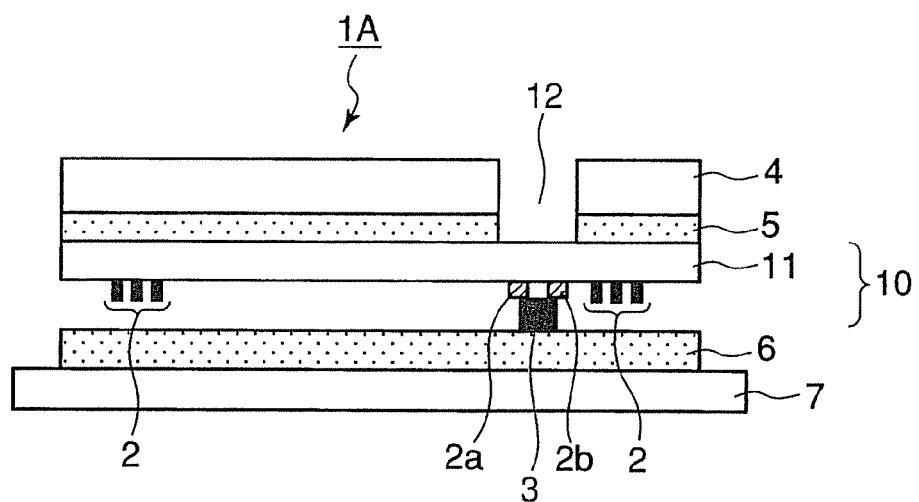
FIG. 2 is a cross-sectional view taken along line A-A in FIG. 1.
Figure 3:
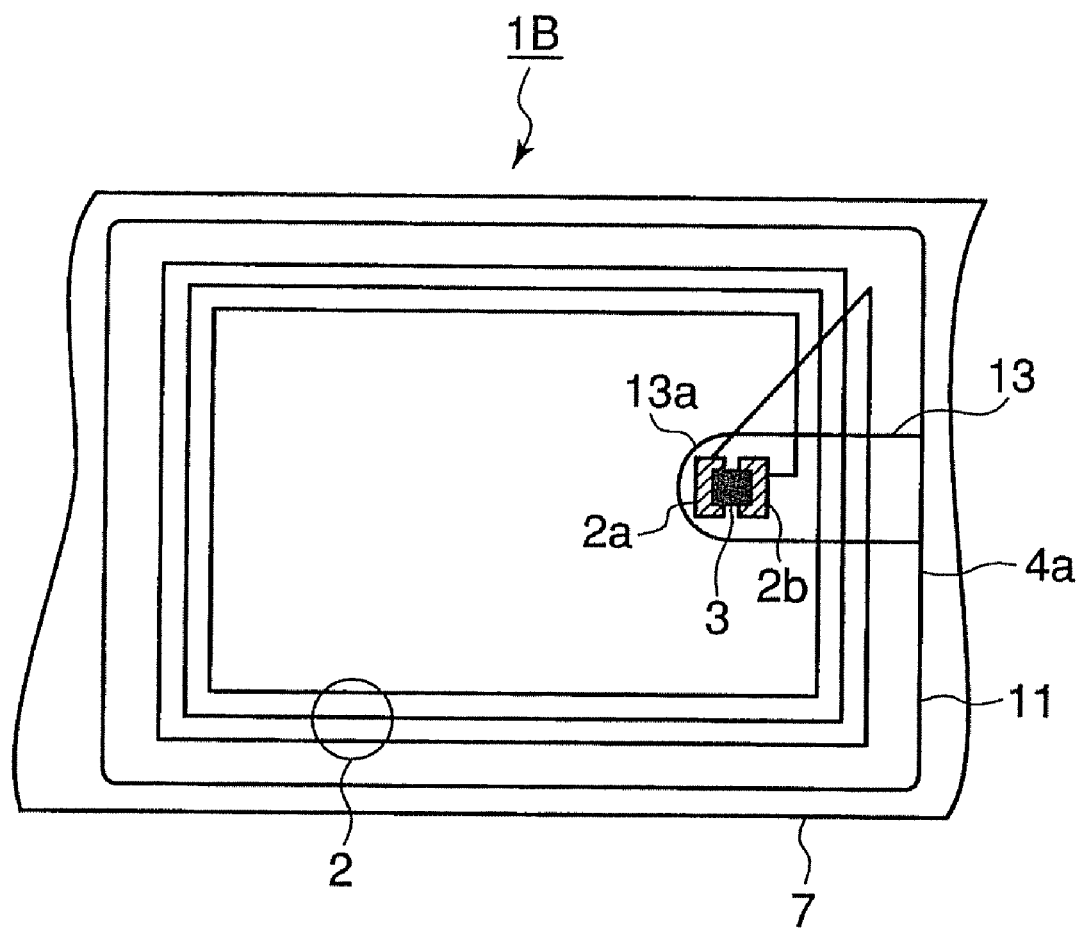
FIG. 3 is a plan view illustrating the IC tag label according to mode 1-2 of the first embodiment of the present invention.
Figure 4:
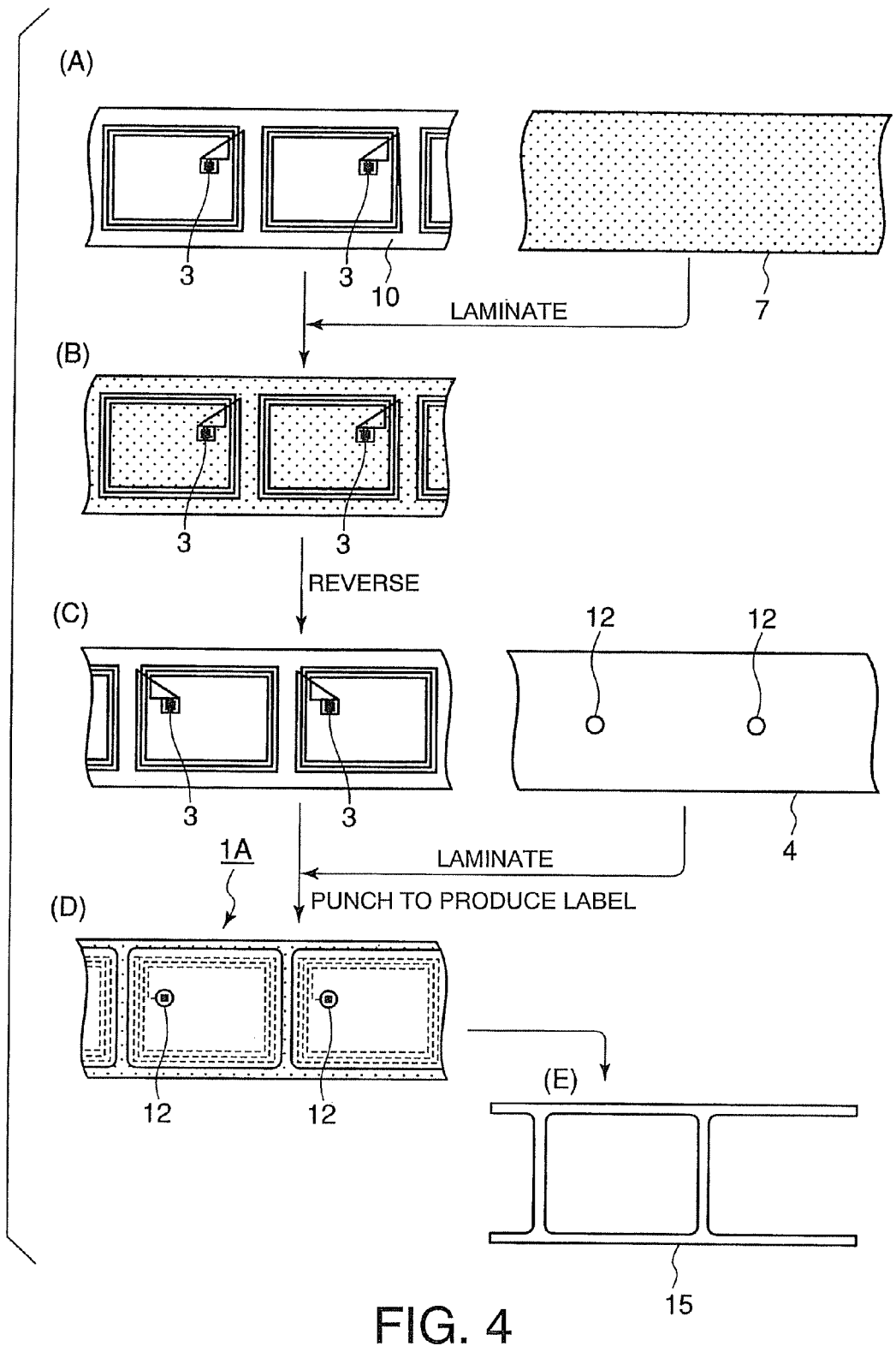
FIGS. 4(A) to 4(E) are diagrams illustrating a manufacturing process for the IC tag label according to mode 1-1 of the first embodiment.

Modes of a first embodiment of the present invention will now be described sequentially with reference to the accompanying drawings. FIG. 1 is a plan view illustrating an IC tag label according to mode 1-1 of the first embodiment. FIG. 2 is a cross-sectional view taken along line A-A in FIG. 1. FIG. 3 is a plan view illustrating the IC tag label according to mode 1-2 of the first embodiment. FIGS. 4(A) to 4(E) are diagrams illustrating a manufacturing process for the IC tag label according to mode 1-1 of the first embodiment. FIGS. 5(A) to 5(E) are diagrams illustrating a manufacturing process for the IC tag label according to mode 1-2 of the first embodiment. FIG. 6 is an external view of an inlet having a coil antenna.

As shown in FIGS. 1 and 2, the IC tag label 1A according to mode 1-1 of the first embodiment includes an inlet substrate 11; an IC chip protection sheet 4, which is mounted on the whole of one surface of the inlet substrate 11 via a protection sheet bond layer or adhesive layer 5; an antenna pattern 2, which is mounted on the other surface of the inlet substrate 11 and provided with both ends 2a, 2b; and an IC chip 3, which is mounted on both ends 2a, 2b of the antenna pattern 2. Further, an adhesive layer 6 is mounted on the other surface of the inlet substrate 11 to cover the antenna pattern 2 and the IC chip 3.

The adhesive layer 6 of the IC tag label 1A configured as described above is covered with a release paper 7.

When the IC chip protection sheet 4 is adhesive, the protection sheet bond layer or adhesive layer 5 is not always necessary. A circular opening 12 which serves as a clearance (clearance space) for the IC chip 3 is formed in a portion of the IC chip protection sheet 4, the portion corresponding to the IC chip 3.

The IC tag label 1A according to mode 1-1 of the first embodiment is characterized in that the IC protection sheet 4 with the circular opening 12, the opening being disposed to match the IC chip 3, is placed on the whole of one surface of the inlet substrate 11. The opening 12 need not always be circular. It may be square or rectangular.

It is assumed that the opening 12 is 2 to 5 mm in diameter when it is circular, or 2 to 5 mm square when it is square. Referring to FIG. 1, the IC tag label 1A is punched out to yield an individual label, and the adhesive layer 6 of each IC tag label 1A is covered with the release paper 7. Each IC tag label 1A is retained by the release paper 7 that has a larger area than the IC tag label 1A. In some cases, however, there may be no groove between the labels so that the width of the IC tag label 1A is equal to that of the release paper 7. The IC tag label 1A according to the present invention may incorporate the functionality of an electromagnetic induction type of planar coil antenna, which is used at a frequency, for instance, of 13.56 MHz, or the functionality of a UHF-band or microwave-band dipole antenna.

FIG. 2 is a cross-sectional view taken along line A-A in FIG. 1. The adhesive layer 6 is disposed on the side that the IC chip 3 and antenna pattern 2 are disposed on the inlet substrate 11, and protected by the release paper 7. Conventional IC tag labels are configured so that the adhesive layer 6 is disposed on the opposite side of the antenna pattern 2 relative to the inlet substrate 11. However, the present invention is characterized in that the adhesive layer 6 is disposed on the side that the antenna pattern 2 is disposed on the inlet substrate 11. Further, the IC tag label 1A includes the IC chip protection sheet 4 which is disposed on the opposite side of the antenna pattern 2 relative to the inlet substrate 11.

The IC chip protection sheet 4 is attached to the inlet substrate 11 with the protection sheet bond layer or adhesive layer 5. However, the protection sheet bond layer or adhesive layer 5 needs not always be provided. The IC chip protection sheet 4 has the opening 12 disposed so as to surround the IC chip 3, so that the IC chip 3 is placed within the opening 12. In FIG. 2, the dimension in the thickness direction of the sheet is magnified and rendered greater than the dimension in the lateral direction. Therefore, FIG. 2 does not exactly represent the real construction of the IC tag label 1A. However, as the inlet substrate 11 deforms due to its flexibility, the thickness of the IC chip, which is much smaller than the dimension of the opening, just fits into the opening 12.

The IC chip protection sheet 4 is disposed on the opposite side of the antenna pattern 2 relative to the inlet substrate 11. Therefore, the IC chip protection sheet 4 does not directly protect the antenna pattern 2. However, the opening 12 can reduce the protrusion height of a portion that corresponds to the IC chip 3 in the IC tag label 1A. Thus, the external pressure applied to the IC chip 3 can be reduced to protect the IC chip 3. When the IC tag label according to the present invention is compared with a conventional IC tag label, it looks as if the inlet substrate disposed on the adhesive layer side is moved above (outside) the IC chip 3 to provide the IC chip with a dual-protection layer. However, a review of all the employed materials indicates that no particular member is added to the IC tag label according to the present invention. FIG. 2 implies that there is a gap between the antenna pattern 2 and the adhesive layer 6. In reality, however, the antenna pattern 2 is in close contact with the adhesive layer 6. When the IC tag label 1A is to be used, the release paper 7 is removed so that the adhesive layer 6 attaches the IC tag label 1A to an article (not shown).

FIG. 3 is a plan view illustrating an IC tag label 1B according to mode 1-2 of the first embodiment. The IC tag label 1B according to mode 1-2 of the first embodiment also includes the IC chip 3 which is mounted on both ends 2a and 2b of the antenna pattern 2. The IC tag label according to mode 1-2 of the first embodiment is characterized in that the IC chip protection sheet 4, which has a cut-out 13 extended from one end edge 4a to a section around the IC chip 3, is placed on the whole of one surface of the inlet substrate 11 and disposed on the opposite side of the antenna pattern 2. The cut-out 13 serves as the clearance for the IC chip 3 and is formed, for instance, by punching a portion of the one end edge 4a side of the IC chip protection sheet 4. The leading end 13a of the cut-out 13 is semicircular or rectangular in shape. It is preferred that the cut-out 13 be formed by cutting a portion of a short side 4a of the IC chip protection sheet 4 that is disposed close to the IC chip 3. The reason is that when IC tag labels are joined side by side and wound with a groove formed by the cut-out 13 disposed at the center of the winding, the IC chip 3 is effectively protected by preventing the center of the winding from swelling up. The size of the semicircular or rectangular leading end is the same as that described in connection with mode 1-1 of the first embodiment.

Even when there is the above-described cut-out 13, the thickness of a portion of the IC tag label 1B that corresponds to the IC chip 3 can be reduced. It means that the function of protecting the IC chip 3 is incorporated.

The cross section of mode 1-2 of the first embodiment is the same as that shown in FIG. 2. However, a cross-sectional view taken along line A-A in FIG. 1 to illustrate mode 1-2 reveals that the IC chip protection sheet 4 is cut off and not present on the right side of the IC chip 3.

An adequate IC chip protection function is performed when the thickness of the IC chip protection sheet 4 (the thickness including the thickness of the bond layer or adhesive layer 5) is substantially equal to the thickness of an actually used IC chip 3 (approximately 100 µm to 200 µm). However, a certain effect is produced even when the IC chip protection sheet 4 is substantially equal in thickness to the conventional surface protection sheet for a noncontact IC tag label. The reason is that the pressure exerted on the IC chip 3 can be reduced when the thickness of a portion of the IC tag label corresponding to the IC chip 3 is more or less decreased. When a conventional surface protection sheet is used, the thickness usually ranges from approximately 15 µm to 30 µm. Therefore, by using materials equivalent thereto, it is advantageous in that a high material cost can be avoided. For example, it is conceivable that the thickness of the IC chip protection sheet 4 may range from 40 nm to 200 nm.

FIG. 6 is an external plan view of an inlet having a coil antenna. The inlet shown in this figure is similar to the one used in an actual product. This figure is obtained when a transparent inlet substrate 11 is viewed from behind (from the side facing the release paper 7).

The antenna pattern 2 is formed on the inlet substrate 11. The IC chip 3 is mounted on both ends 2a and 2b of the antenna pattern 2. A conductive member 8 is provided as a back-surface circuit that can prevent a short circuit from being formed with respect to an antenna coil. The antenna pattern 2 is formed by etching a laminated foil of metal (aluminum, copper, etc.) into the inlet substrate 11. As the metal foil thickness ranges from approximately 10 µm to 40 µm, the metal foil is thinner than the IC chip 3. The profile of the coil for a unit IC tag label 1 varies in size and measures, for instance, 40 mm by 45 mm or 45 mm by 75 mm. It should be noted that the present invention is also applicable to a dipole antenna (not shown). When a half-wave dipole antenna is used, its overall length is limited to 4 inches.

The sheet composed of the inlet substrate 11, antenna pattern 2, and IC chip 3 is generally called an inlet 10 or an inlet base 10.

<Materials>

(1) Inlet Substrate 11

A wide variety of plastic films may be used. One of the following films or a complex film made of the following films may be, for instance, punched for use.

The film to be used may be made, for instance, of polyethylene terephthalate (PET), PET-G (terephthalic acid-cyclohexane dimethanol-ethylene glycol copolymer), polyvinyl chloride, vinyl chloride-vinyl acetate copolymer, polycarbonate, polyamide, polyimide, cellulose diacetate, cellulose triacetate, polystyrene, ABS, polyacrylic acid ester, polypropylene, polyethylene, or polyurethane.

(2) IC Chip Protection Sheet 4

For example, high-quality paper, coated paper, or synthetic paper may be used. In addition, the same materials as for the plastic film for the inlet substrate may be used.

(3) Adhesive Layer 6 and Protection Sheet Bond Layer or Adhesive Layer 5

This document assumes that the bond layer is, for instance, of a solvent type, a cured type, an ultraviolet curable type, an emulsion type, or a hot-melt type, and includes a so-called adhesive type. The reason is that an intended purpose is achieved as far as target materials are attached to each other no matter what type is employed.

Further, this document assumes that the adhesive layer does not exhibit a remarkable gradual increase of viscosity and remains slightly adhesive, that is, tacky. The bond and adhesive layers may be made of various resin components such as natural rubber, nitrile rubber, epoxy resin, vinyl acetate emulsion, polyester, acrylic, acrylic acid ester copolymer, polyvinyl alcohol, and phenol resin.

A method of manufacturing the IC tag label according to the present invention will now be described. The IC tag label according to the present invention can be manufactured by substantially the same method as that for conventional IC tag labels. However, the IC tag label according to the present invention is characterized in that the positional relationship of the adhesive layer 6 to the inlet 10 is opposite to that observed in a conventional IC tag label, and that an IC chip protection sheet 4 with an opening or a cut-out is attached to the IC tag label. Therefore, the IC tag label according to the present invention is to be manufactured with such characteristics taken into account.

FIGS. 4(A) to 4(E) are diagrams illustrating a manufacturing process for the IC tag label 1A according to mode 1-1 of the first embodiment. First of all, a conventional process is performed by manufacturing the inlet (with the IC chip 3 mounted on the antenna pattern 2 on the inlet substrate 11) 10 (FIG. 4(A)), and covering the surface of the antenna pattern 2 of the inlet 10 with the release paper 7 on which the adhesive layer 6 is coated (FIG. 4(B)). Then, with the inlet 10 reversed (FIG. 4(C)), the IC chip protection sheet 4 with the opening 12 is laminated to the inlet substrate 11 via the protection sheet bond layer or adhesive layer 5 so that the IC chip protection sheet 4 is disposed on the opposite side of the antenna pattern 2 relative to the inlet substrate 11. Next, a laminate composed of the inlet 10 and IC chip protection sheet 4 is punched to produce unit IC tag labels (FIG. 4(D)). A rotary die cutter or a flat punch blade is used to punch out the opening 12 and unit IC tag labels. The punched IC tag label 1A, which is punched out, is formed on the surface of the release paper 7 as shown in FIG. 1. Cuttings 15 produced as a result of punching are removed (FIG. 4(E)).

The IC tag label 1A according to mode 1-1 of the first embodiment of the present invention is now completed. The manufacturing process described above can also be performed by using an automated production line for a conventional IC tag label.

FIGS. 5(A) to 5(E) are diagrams illustrating a manufacturing process for the IC tag label 1B according to mode 1-2 of the first embodiment. First of all, the inlet 10 is manufactured (FIG. 5(A)) as is the case with the mode 1-1, and then the release paper 7 on which the adhesive layer 6 is coated is laminated to the surface of the antenna pattern 2 on the inlet 10 (FIG. 5(B)). Next, the inlet 10 is reversed (FIG. 5(C)), and the IC chip protection sheet 4 is laminated to the inlet 10 with the protection sheet bond layer or adhesive layer 5.

The cut-out 13 and IC chip protection sheet 4 punched (or partially half-cut) to are shaped to be slightly larger than the shape prevailing upon completion of the IC tag label 1B, and the IC chip protection sheet 4 with the protection sheet bond layer or adhesive layer 5 and release paper (not shown) is used. While the release paper is removed, this IC chip protection sheet 4 is attached to the inlet substrate 11 together with the protection sheet bond layer or adhesive layer 5 in such a manner that the IC chip protection sheet 4 is disposed on the opposite side of the antenna pattern 2 relative to the inlet substrate 11 (FIG. 5(C)). This process is performed with a labeling machine so that only the label shape portion of the punched IC chip protection sheet 4 is aligned with the inlet 10 to adhere to each other. Labeling is facilitated when it is conducted in such a manner that a label shape cut side c disposed opposite of the cut-out 13 side in the IC chip protection sheet 4 first comes into contact with the inlet 10.

Figure 5:
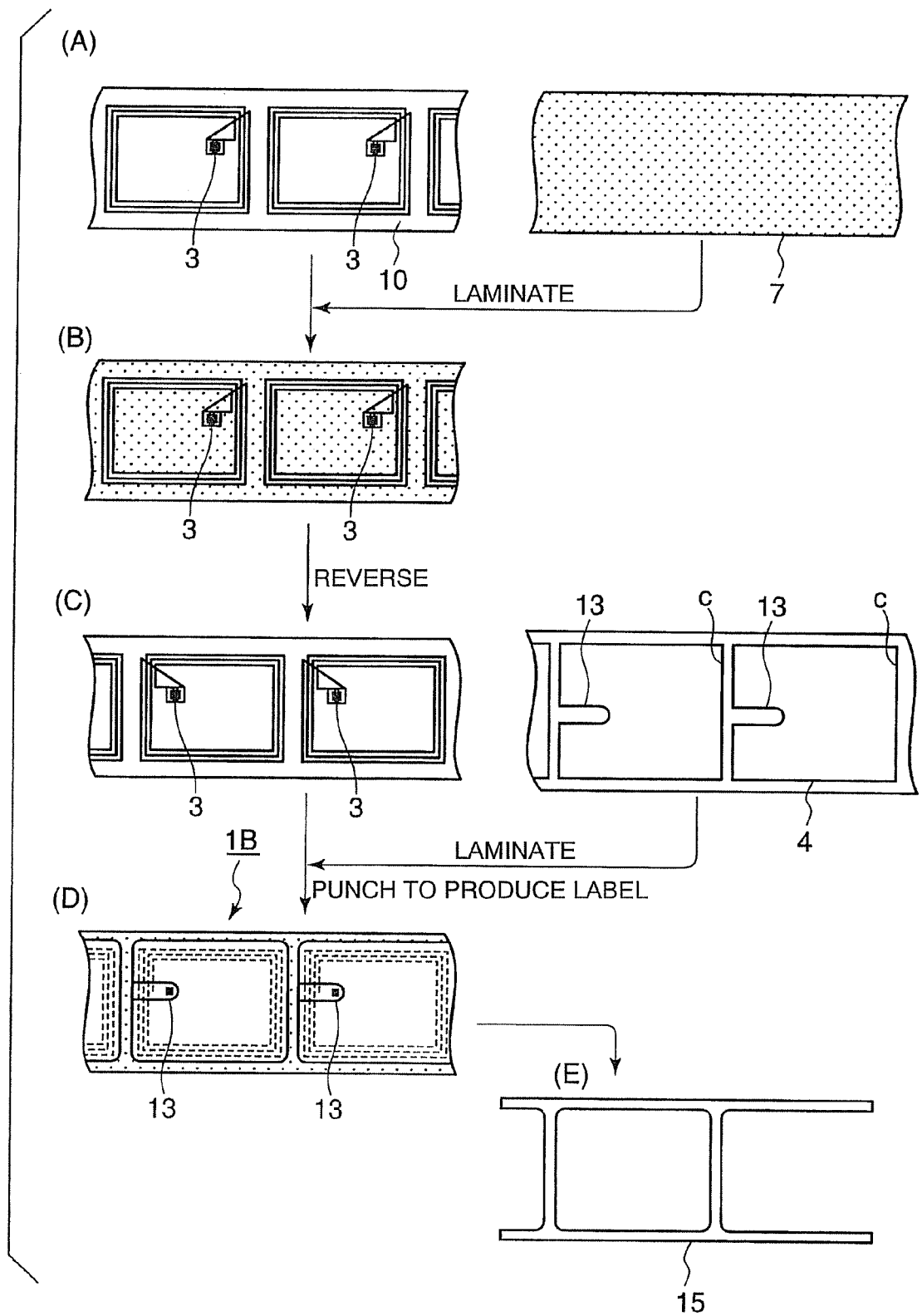
FIGS. 5(A) to 5(E) are diagrams illustrating a manufacturing process for the IC tag label according to mode 1-2 of the first embodiment.
Figure 6:
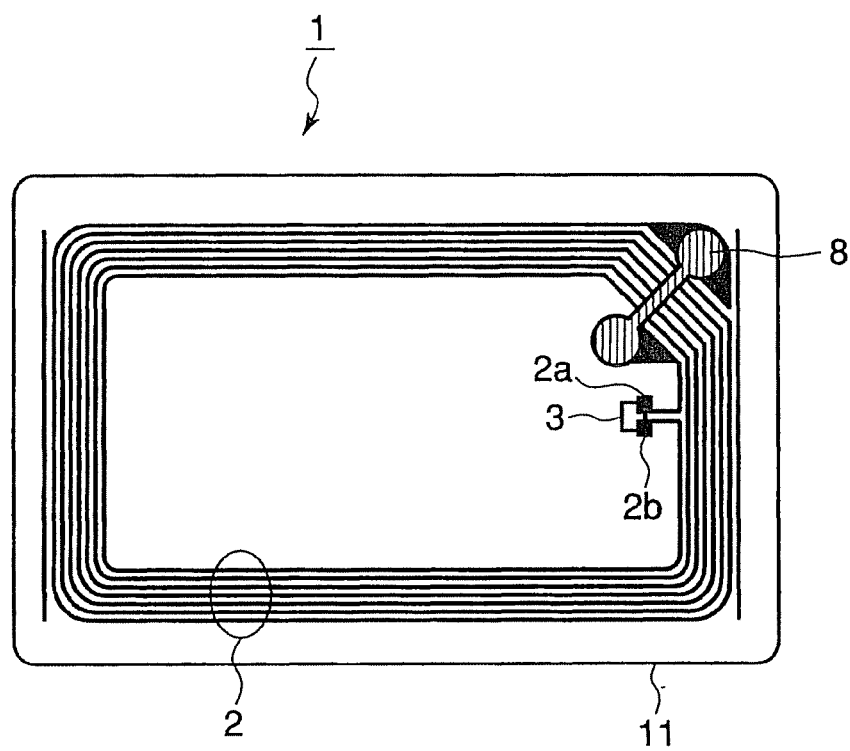
FIG. 6 is an external plan view of an inlet having a coil antenna.

Next, the inner portion of the IC chip protection sheet 4, the inner portion being substantially shaped like a label, is accurately punched to a unit label shape (FIG. 5(D)). The cuttings 15, which are produced as a result of punching, are removed (FIG. 5(E)). The IC tag label 1B according to mode 1-2 of the first embodiment is now completed. The manufacturing process described above can also be performed by using a conventional automated IC tag production line that includes a labeling mechanism.

Example 1 of First Embodiment (Preparing the Inlet)
A transparent biaxially-stretched polyethylene terephthalate (PET) film, which was 65 mm wide and 20 μm thick, was used as the inlet substrate 11. A 25 μm thick aluminum foil was dry-laminated to the inlet substrate 11 to produce a web material. A print resist was then used to print a coiled antenna pattern onto the web material. Next, etching was conducted to mount the conductive member 8 and complete the antenna pattern 2 shown in FIG. 6. The external size of the antenna pattern 2 was such that it measured approximately 45 mm by 76 mm. A plurality of antenna patterns 2 were disposed at intervals of 88 mm. The IC chip 3 having a planar size of 1.0 mm square, a thickness of 120 μm, and a spike-like bump was mounted in a face-down manner on both ends 2a, 2b of the antenna pattern 2 under thermal pressure to complete the inlet 10 in a continuous strip form (FIG. 4(A)).

(Preparing the IC Chip Protection Sheet)
A PET sheet measuring 65 mm wide and 40 μm thick (this thickness includes the thickness of a 15 μm thick adhesive layer 5 that was applied as a coat) was used as the IC chip protection sheet 4. A circular opening 12 having a diameter of 3 mm was cut in a portion of the IC chip protection sheet 4, the portion corresponding to the IC chip 3. A plurality of circular openings 12 were disposed at intervals of 88 mm. The opening 12 was made with a rotary die cutter.

(Manufacturing the IC Tag Label)
An adhesive process was performed so that a 75 mm wide release paper 7 was pressure-bonded to the surface of the antenna pattern 2 side of the inlet 10 via a 20 μm adhesive layer 6. A silicone-coated glassine paper (80 μm in thickness) was used as the release paper 7 (FIG. 4(B)). Next, the inlet 10 was reversed (FIG. 4(C)). Then, the IC chip protection sheet 4 was laminated to the inlet substrate side surface of the inlet 10 via the protection sheet bond 5 while an IC tag machine was operated to position the IC chip 3 at the center of the circular opening 12 in the IC chip protection sheet 4 prepared as described above (it should be noted, however, that the IC chip 3 was disposed on the opposite side relative to the inlet substrate 11). Subsequently, the area above the release paper 7 was punched with a die cutter to produce a label that measured 54 mm by 82 mm. A plurality of IC tag labels 1A, which were joined side by side, were completed (FIG. 4(D)).

Example 2 of First Embodiment (Preparing the Inlet)
A transparent biaxially-stretched PET film, which was 65 mm wide and 20 μm thick, was used as the inlet substrate 11. A 25 μ thick aluminum foil was dry-laminated to the inlet substrate 11 to produce a web material. The same process was performed on the web material as described in connection with Example 1 of the first embodiment to complete the inlet 10 in a continuous strip form (FIG. 5(A)). The same IC chip 3 was used as in Example 1 of the first embodiment.

(Preparing the IC Chip Protection Sheet)
A resin-coated paper measuring 70 mm wide and 60 μm thick (this thickness includes the thickness of a 20 μm thick adhesive layer 5) was used as the IC chip protection sheet 4. A cut-out 13 composed of a 4 mm diameter semicircle and a 4 mm wide groove following the semicircle was made at the position of the IC chip protection sheet 4 corresponding to the IC chip 3 of the inlet 10. A plurality of cut-outs 13 were disposed at intervals of 88 mm (see FIG. 3). Simultaneously, the portion of the adhesive layer 5 and resin-coated paper (protection sheet 4) was punched to provide an external form slightly larger than the actual external form. This punching operation was performed to obtain a shape that is substantially the same as the shape of the IC tag label. It should be noted that the groove included in the cut-out 13 was open toward a short side 4a of the IC tag label.

The above punching process was performed with a rotary die cutter while release paper is attached to both surfaces of the IC chip protection sheet 4.

(Manufacturing the IC Tag Label)
An adhesive process was performed so that a 75 mm wide, 100 μm thick release paper 7 was attached to the surface of the antenna pattern 2 side of the inlet 10 via a 30 μm thick adhesive layer 6 (FIG. 5(B)). A silicone-coated paper was used as the release paper 7. Next, the inlet 10 was reversed (FIG. 5(C)). Then, an IC tag machine was operated to position the IC chip 3 at the semicircular center of the cut-out 13 in the IC chip protection sheet 4 prepared as described above (it should be noted, however, that the IC chip 3 is disposed on the opposite side relative to the inlet substrate 11), and attach the IC chip protection sheet 4 to the inlet substrate side surface of the inlet 10 via the protection sheet adhesive layer 5 while the release paper (not shown) was removed. In order to perform pressure bonding, a labeling device of the IC tag machine was used. Subsequently, the IC tag label 1B was completed with a die cutter by punching out a label measuring 54 mm by 82 mm (FIG. 5(D)).

The noncontact IC tag labels according to Examples 1 and 2 and of the first embodiment were used for testing purposes under the same conditions as for the conventional IC tag labels. The obtained test results indicate that the probability of a failure caused by IC chip breakage is remarkably reduced. It is also found that while the IC tag label according to the first embodiment is in the form of a wound product, the IC chip is less likely to become damaged due to strong pressure that is exerted by winding during manufacture or after completion of production.

Second Embodiment

An IC tag label according to a second embodiment of the present invention will now be described with reference to FIG. 7.

Figure 7:
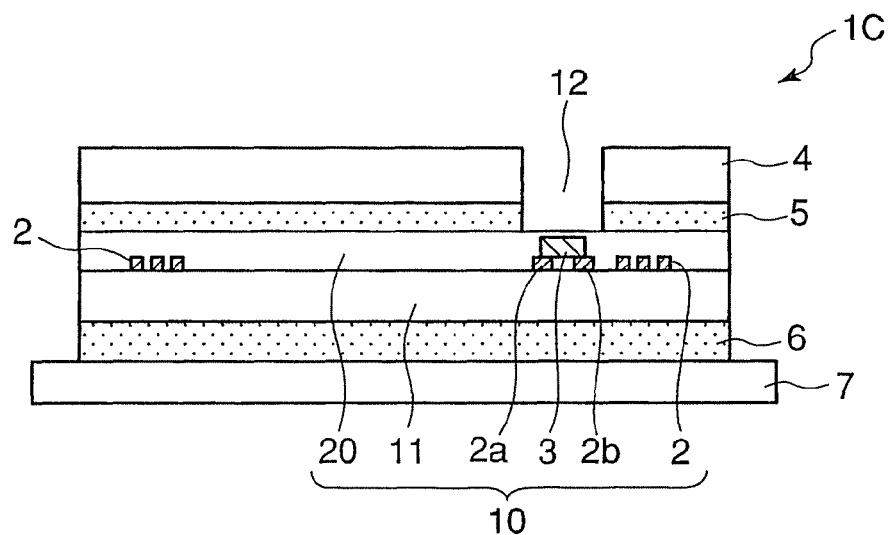
FIG. 7 is a sectional side view illustrating the IC tag label according to a second embodiment of the present invention.

The IC tag label IC according to the second embodiment, which is shown in FIG. 7, is similar in configuration to the IC tag label 1A according to mode 1-1 of the first embodiment, which is shown in FIGS. 1 and 2, except that the antenna pattern 2 and IC chip 3 are mounted on one surface of the inlet substrate 11 and then the surface is covered with an additional film 20.

More specifically, the IC tag label 1C includes the inlet substrate 11; the antenna pattern 2, which is mounted on one surface of the inlet substrate 11 and provided with both ends 2*a*, 2*b*; and the IC chip 3, which is mounted on both ends of the antenna pattern 2, as shown in FIG. 7. The additional film 20 is mounted on one surface of the inlet substrate 11 to cover the antenna pattern 2 and IC chip 3. The IC chip protection sheet 4 is attached to the additional film 20 via the protection sheet bond layer or adhesive layer 5.

The additional film 20 prevents the IC chip 3 from being directly exposed to the outside. The additional film 20 may be made of PET (polyethylene terephthalate), PE (polyethylene), PP (polypropylene), or PEN (polyethylene naphthalate).

The adhesive layer 6 is attached to the other surface of the inlet substrate 11.

The surface of the adhesive layer 6 of the IC tag label 1C configured as described above is covered with the release paper 7.

When the IC chip protection sheet 4 has an adhesive property, the protection sheet bond layer or adhesive layer 5 need not always be provided. Further, the circular opening 12, which serves as the clearance for the IC chip 3, is formed in a portion of the IC chip protection sheet 4, the portion corresponding to the IC chip 3.

Referring to FIG. 7, the opening 12, which serves as the clearance for the IC chip 3, is formed in the IC chip protection sheet 4. Therefore, the opening 12 can reduce the protrusion height, of a portion corresponding to the IC chip 3, of the IC tag label 1C. This makes it possible to protect the IC chip 3 by reducing the external pressure applied to the IC chip 3.

Third Embodiment

A third embodiment of the present invention will now be described with reference to FIG. 8.

Figure 8:
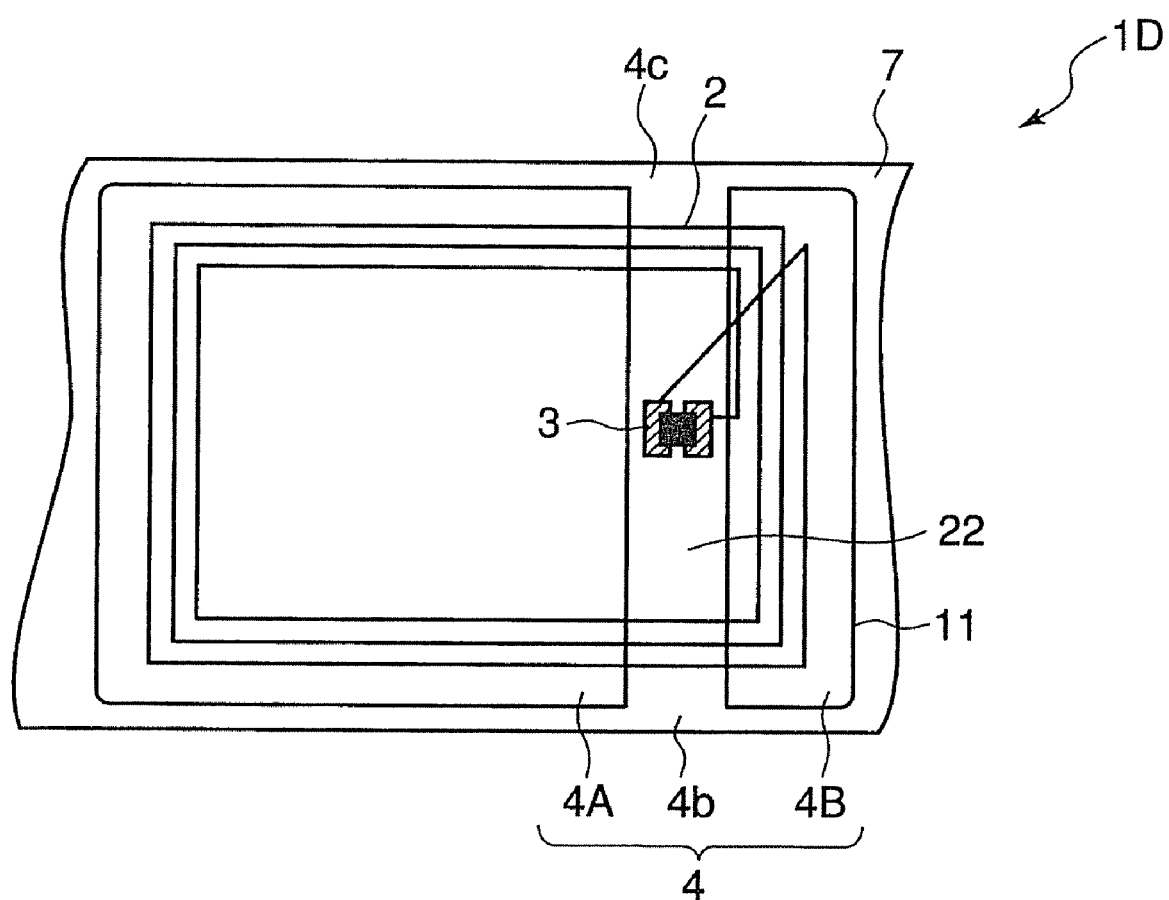
FIG. 8 is a plan view illustrating the IC tag label according to a third embodiment of the present invention.

The IC tag label 1D according to the third embodiment, which is shown in FIG. 8, is similar in configuration to the IC tag label 1A according to mode 1-1 of the first embodiment, which is shown in FIGS. 1 and 2, except that a portion of the IC chip protection sheet 4, the portion corresponding to the IC chip 3, is provided with a belt-like groove 22, which extends from one end edge 4*b* of the IC chip protection sheet 4 to the other end edge 4*c* to form the clearance for the IC chip 3.

More specifically, the IC tag label 1D according to the third embodiment includes the inlet substrate 11; the IC chip protection sheet 4, which is mounted on the whole of one surface of the inlet substrate 11 via the protection sheet bond layer or adhesive layer 5; the antenna pattern 2, which is mounted on the other surface of the inlet substrate 11 and provided with both ends 2*a*, 2*b*; and the IC chip 3, which is mounted on both ends 2*a*, 2*b* of the antenna pattern 2. Further, the adhesive layer 6 is mounted on the other surface of the inlet substrate 11 to cover the antenna pattern 2 and the IC chip 3.

The surface of the adhesive layer 6 of the IC tag label 1D which is configured as described above is covered with the release paper 7.

When the IC chip protection sheet 4 has an adhesive property, the protection sheet bond layer or adhesive layer 5 need not always be provided. Further, the belt-like groove 22, which is extended from one end edge 4*b* of the IC chip protection sheet 4 to the other end edge 4*c* to serve as the clearance for the IC chip 3, is formed in a portion of the IC chip protection sheet 4, the portion corresponding to the IC chip 3. When the IC chip protection sheet 4 is provided with the belt-like groove 22 as described above, a pair of strip-shaped structures 4A, 4B, which constitute the IC chip protection sheet 4, are formed on either side of the belt-like groove 22.

Referring to FIG. 8, the belt-like groove 22, which serves as the clearance for the IC chip 3, is formed in the IC chip protection sheet 4. Therefore, the belt-like groove 22 can reduce the protrusion height, of a portion corresponding to the IC chip 3, of the IC tag label 1D. This makes it possible to protect the IC chip 3 by reducing the external pressure applied to the IC chip 3.

The invention claimed is:

1. An IC tag label comprising:
   an inlet substrate;
   an antenna pattern and an IC chip mounted on either one surface or the other surface of the inlet substrate;
   an IC chip protection sheet mounted on one surface of the inlet substrate; and
   an adhesive layer mounted on the other surface of the inlet substrate,
   wherein a clearance for the IC chip is provided in a portion of the IC chip protection sheet, the portion corresponding to the IC chip, and
   wherein the antenna pattern and the IC chip are mounted on one surface of the inlet substrate, and an additional film for covering the antenna pattern and the IC chip is disposed between the inlet substrate and the IC chip protection sheet.

2. An IC tag label comprising:
   an inlet substrate;
   an antenna pattern and an IC chip mounted on either one surface or the other surface of the inlet substrate;
   an IC chip protection sheet mounted on one surface of the inlet substrate; and an adhesive layer mounted on the other surface of the inlet substrate, wherein a clearance for the IC chip is provided in a portion of the IC chip protection sheet, the portion corresponding to the IC chip, and wherein a cut-out that is extended to one end edge of the IC chip protection sheet to provide the clearance for the IC chip is made in a portion of the IC chip protection sheet, the portion corresponding to the IC chip.

3. An IC tag label comprising:

an inlet substrate;

an antenna pattern and an IC chip mounted on either one surface or the other surface of the inlet substrate;

an IC chip protection sheet mounted on one surface of the inlet substrate; and an adhesive layer mounted on the other surface of the inlet substrate, wherein a clearance for the IC chip is provided in a portion of the IC chip protection sheet, the portion corresponding to the IC chip, and wherein a belt-like groove that is extended from one end edge of the IC chip protection sheet to the other end edge thereof to provide the clearance for the IC chip is made in a portion of the IC chip protection sheet, the portion corresponding to the IC chip, and a pair of strip-shaped structures, which constitute the IC chip protection sheet, are formed on either side of the belt-like groove.

4. The IC tag label according to claim 1, wherein an opening that serves as the clearance for the IC chip is provided in a portion of the IC chip protection sheet, the portion corresponding to the IC chip.

5. The IC tag label according to claim 2, wherein the antenna pattern and the IC chip are mounted on the other surface of the inlet substrate.

6. The IC tag label according to claim 1, wherein the IC chip protection sheet includes a plastic sheet and a protection sheet bond layer or adhesive layer, and has a thickness between 40 nm and 200 nm.

7. The IC tag label according to claim 1, wherein the IC chip protection sheet includes a paper substrate and a protection sheet bond layer or adhesive layer, and has a thickness between 40 nm and 200 nm.

8. The IC tag label according to claim 3, wherein the antenna pattern and the IC chip are mounted on the other surface of the inlet substrate.

9. The IC tag label according to claim 2, wherein an opening that serves as the clearance for the IC chip is provided in a portion of the IC chip protection sheet, the portion corresponding to the IC chip.

10. The IC tag label according to claim 3, wherein an opening that serves as the clearance for the IC chip is provided in a portion of the IC chip protection sheet, the portion corresponding to the IC chip.

11. The IC tag label according to claim 2, wherein the IC chip protection sheet includes a plastic sheet and a protection sheet bond layer or adhesive layer, and has a thickness between 40 nm and 200 nm.

12. The IC tag label according to claim 3, wherein the IC chip protection sheet includes a plastic sheet and a protection sheet bond layer or adhesive layer, and has a thickness between 40 nm and 200 nm.

13. The IC tag label according to claim 2, wherein the IC chip protection sheet includes a paper substrate and a protection sheet bond layer or adhesive layer, and has a thickness between 40 nm and 200 nm.

14. The IC tag label according to claim 3, wherein the IC chip protection sheet includes a paper substrate and a protection sheet bond layer or adhesive layer, and has a thickness between 40 nm and 200 nm.

* * * * *